G. E. DALE.
VEHICLE BRAKE.
APPLICATION FILED MAY 1, 1918.

1,332,487.

Patented Mar. 2, 1920.
2 SHEETS—SHEET 2.

WITNESSES
W. C. Fielding
H. G. Pierson

INVENTOR
Glenn E. Dale

BY Richard Owen

ATTORNEY

UNITED STATES PATENT OFFICE.

GLENN E. DALE, OF GREAT FALLS, MONTANA.

VEHICLE-BRAKE.

1,332,487.   Specification of Letters Patent.   Patented Mar. 2, 1920.

Application filed May 1, 1918. Serial No. 231,898.

*To all whom it may concern:*

Be it known that I, GLENN E. DALE, a citizen of the United States, residing at Great Falls, in the county of Cascade and State of Montana, have invented certain new and useful Improvements in Vehicle-Brakes, of which the following is a specification.

This invention is a vehicle brake, and is more particularly adapted for use upon self propelled vehicles, wherein cone shaped frictionally engaging members are employed for a retarding effect upon the progress of the vehicle.

With the ordinary type of band brake employed the band must be equalized so that it will grip the drum at all points. This is done in various ways such as connecting the band intermediate its ends to a stationary pin so that the ends, when drawn together, bring each part of the band into contact with the drum. Even with the various devices it is hard to adjust the brake so that it will grip properly. Then again it requires considerable care to adjust both of the bands so that they will take hold simultaneously.

Much damage can be done to the rear axle assembly applying the ordinary band brakes improperly adjusted. This occurs when one band grips tighter than the other and thus causes power to be transmitted to the more tightly gripped wheel. The differential then does not transmit power equally to both wheels.

With the band brake type, the coefficient of friction of the brake lining and the drum, varies according to the pressure applied in drawing the ends of the band together. But with the cone type the coefficient increases as the male member is forced into the female member which forcing requires less energy than in applying the band brake.

Wider braking or friction surfaces may be employed with the assurance that contact will be made at all points and with substantially equal pressures. It is thought preferable to have an angularity of from 12° to 15° for the cone engaging surfaces, as this gives about ¼ of the diameter of the female member as the breadth of the friction surface. This amount of angularity will also permit of the cone engaging without gripping and will also permit the cones to be readily disengaged without sticking.

Broadly stated the invention comprises a female cone member secured to a wheel and rotatable therewith. A slidably mounted male cone member provided with a hub, which hub has one of its ends irregularly formed, a stationary collar having one of its ends formed with complemental irregularities to the end of the hub, a rotatable sleeve carrying radially inwardly projecting members adapted to engage with the irregularly shaped ends of the hub and collar, means for rotating the sleeve so as to move the elements and thereby slide the male cone member into engagement with the female cone member, said collar being provided with extending arms having holes therein, springs interposed between the male cone member and the arms and connected thereto for normally maintaining the male cone in a retracted position, an arm extending from the rotatable sleeve, and a spring between said arm and one of the extending arms of the collar for maintaining the collar in its normal inoperative position, irregularly shaped ends of the hub and collar being so formed that they provide a groove therebetween that is of varying widths.

One practical form of construction and assembly will be described and illustrated in the accompanying drawings, in which:—

Figure 1:
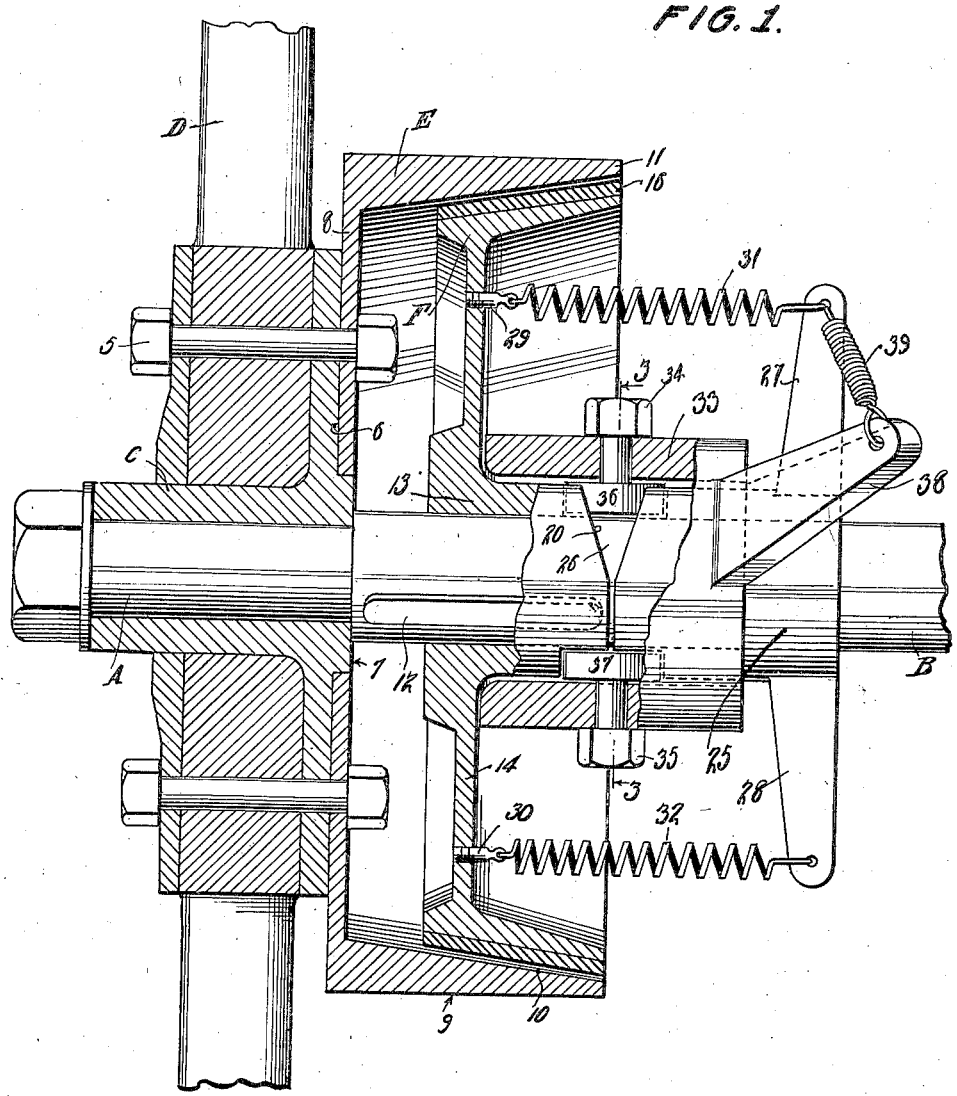
Figure 1 is a top plan view partly in section of the assembly.
Figure 2:
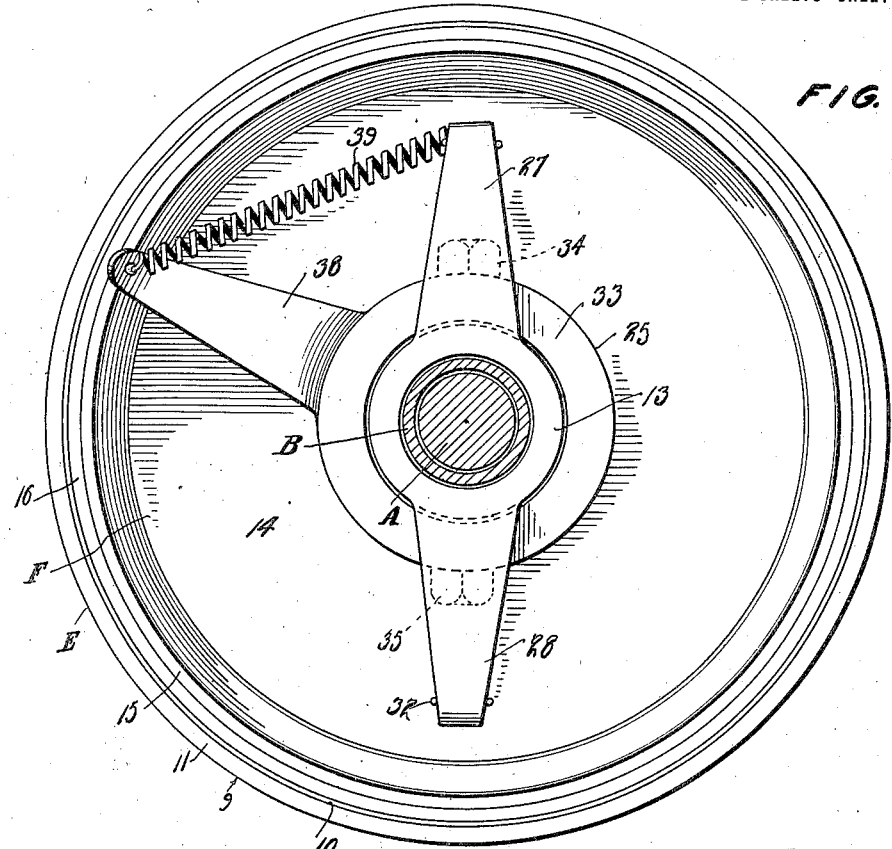
Fig. 2 is an end elevation looking at the assembly from the right hand side of Fig. 1.
Figure 3:
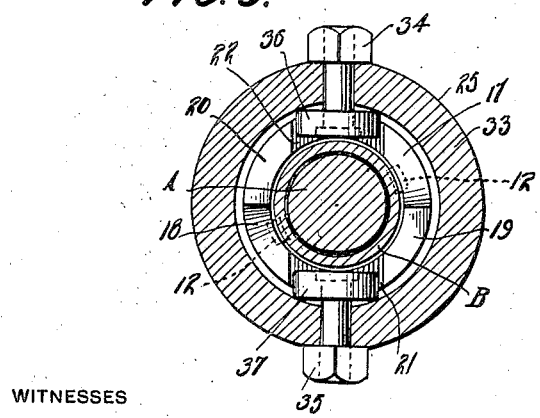
Fig. 3 is a sectional view on the line 3—3 of Fig. 1.

In the preferred embodiment about to be described, there is provided the usual vehicle axle indicated at A that is surrounded by the usual tubing B. If desired, instead of employing tubing the axle may be made continuous and the letter B will indicate the larger diameter portion. Upon one end of the shaft A there is provided, adjacent said end, a hub generally indicated at C that carries the spokes D.

These spokes may be secured in the hub in the usual manner which in the present instance is indicated by the bolts 5. The inner flange of the hub C is provided with an annular recess 6 forming a shoulder with the boss 7. Secured in the recess 6 is a female cone member generally indicated at E. The member as shown is approximately cup shaped and its bottom wall 8 rests in the recess 6. This bottom wall 8 is provided with a series of concentrically arranged holes to coöperate with the bolt 5 in holding the female cone member E in position upon the hub.

The spacing of these bolts should be such that the female member is substantially an integral part of the wheel assembly. The member E has its outer wall 9 preferably arranged at right angles to the bottom wall 8. The inner wall 10 is preferably tapered or cone shaped, the taper increasing from the open end 11 toward the bottom wall 8. This inner wall is preferably concentric to the axis of the shaft A. The tubing B is preferably provided at one point with a spline 12.

This spline may be of any usual type or form and if desired several may be employed in order to give greater rigidity. This spline is so arranged that it extends longitudinally of the tubing 8 from adjacent the hub C and serves to slidably mount the hub 13 of the male cone member F. The hub 13 is provided with a web 14 that is provided with a tapering wall or cone shaped rim 15. This cone shaped rim 15 may be provided with suitable friction material 16 as shown.

Figure 4:
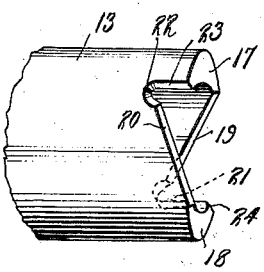
Fig. 4 is a perspective of the end of the hub, the opposite configuration being employed on the end of the stationary collar.

The hub 13 has one of its ends irregularly formed as shown more particularly in Fig. 4. This end is provided with two segmentally shaped portions 17 and 18. From one end of each one of these segmentally shaped portions 17 and 18 the peripheral wall slopes and forms the riding portion indicated at 19 and 20. Each one of these riding portions 19 and 20 terminates in semi-circular notches or recesses 21 and 22. To connect the other end of the segment 17 with the recess 22 there extends longitudinally inward a straight wall portion 23.

To connect the segmental portion 18 with the recess 21 the wall extends longitudinally inward as indicated at 24. These segmental portions 17 and 18 may be formed as approximate crescents as shown in Fig. 4. This formation will then permit its cusps to be connected with the sloping wall riding portions 19 and 20. To coöperate with this irregularly shaped end of the hub 13 there is provided a collar 25 that is preferably rigidly secured to the tubing B. This collar has one of its ends shaped in the same general manner as that indicated for the hub 13 in Fig. 4 or the irregularities are just oppositely arranged. This arrangement of the irregular surfaces will produce a groove 26 between the ends of the collar and hub. This groove as shown more particularly in Fig. 1 is of varying widths due to the arrangement of the riding surfaces 19 and 20.

As the end formation of the collar is similar to that of the hub no separate description will be given. The other end of the collar is provided with two laterally extending arms indicated at 27 and 28 that are provided with suitable holes adjacent their outer ends. This collar 25 may be rigidly secured to the tubing B in any usual or suitable manner. The web portion 14 of the male cone member F is provided at suitable points with threaded holes so that the threaded blocks 29 and 30 may be secured therein.

These blocks 29 and 30 are provided with eye ends that permit one end of the springs 31 and 32 to be connected in the holes formed near the ends of the arms 27 and 28. Rotatably mounted upon the hub 13 and the collar 25 is a sleeve 33. At suitable points the sleeve 33 is provided with radial holes which permit the passage of the bolts 34 and 35 therethrough. These bolts have their heads round and provided with a shoulder. The heads and the shoulder portion of the bolt provide for the attachment of the disks 36 and 37 that are to serve as camming elements.

Any particular shape may be employed that is different from the circle if the same will better and more effectively produce a camming action. These disks 36 and 37 are so arranged in the groove 26, formed between irregularly shaped ends of the hub 13, and the collar 25, that when the sleeve 33 is rotated it tends to force the male cone member F into engagement with the female member E. To rotate the sleeve 33 for causing a reciprocation of the male cone F the sleeve 33 is provided with an arm 38 that projects laterally and angularly from the collar 33.

This arm 38 is provided near its outer end with a hole that affords a connection with one end of a spring 39 and affords a suitable connection for the brake rod which leads to the forward part of the vehicle and connects to the brake operating lever. The other end of this spring 39 is secured in the hole near the end of the arm 27 which in Fig. 1 has connected to it the spring 31. As shown in Fig. 1 the two cones are so arranged that the female member E is rotatable by the wheel structure and the male cone remains preferably stationary on the tubing B.

This male member F is retained stationary so far as rotation is concerned but it may be reciprocated longitudinally of the tube B. The key or spline 12 prevents the rotation while permitting of reciprocation. As shown in Fig. 1 when the arm 38 is actuated it will rotate the collar 33 which causes the cam disks 36 and 37 to move in the groove 26. It will be noticed from Fig. 1 that the groove is of varying widths and as the sleeve is rotated these disks tend to force the hub and collar apart. This is done with somewhat a wedging action due to the inclination of the riding surfaces 19 and 20, formed upon the ends of the hub and collar.

As the hub 25 is preferably rigidly secured this will cause the hub and the male cone member F to move longitudinally on the tubing. The springs 31 and 32 act normally to maintain the male cone in a retracted position and out of engagement with the female cone E. When the sleeve 33 is rotated it changes the tension of the springs 31 and 32 causing them to expand and thus a gradual application of the brake may be made on the progress of the vehicle. The use of the two cones will permit a certain amount of slippage to occur if the members are too forcibly brought together until the progression of the vehicle is retarded to a point where the frictional engagement will increase.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A vehicle brake, which comprises a female wheel member having a tapered inner periphery, a slidable male member having a tapered periphery and adapted to be frictionally engaged with the inner periphery of the female member, said male member being provided with a hub, one end of which is angularly cut to provide different lengths to the hub, a stationary hub having one of its ends formed complementarily to the male member hub to provide an annular groove therebetween that is of different widths, a rotatable sleeve encircling the hubs and provided with cams adapted to ride in the groove and serving to move the male member said sleeve being further provided with an arm projecting angularly therefrom, and said stationary hub being provided with laterally extending arms, springs connected with said latter arms and the male member, and serving to retract said member from engagement with the female member, a spring interposed between the arm of the rotatable sleeve and one of the arms of the stationary hub and serving to restore the sleeve to its normal and inoperative position, means for adjusting the tension of the springs, and means for rotating said sleeve for causing the male member to engage with the female member.

2. A brake, comprising a wheel member, a female cone member carried by said wheel member, an axle, a rigid tubing encircling the axle and abutting against said wheel member, a male cone member slidably mounted on the tubing for engagement with the female cone member, a hub on the male cone member provided at one end with cam surfaces, a collar rigidly secured to the tubing adjacent the hub, said collar being provided with cam surfaces adjacent those of the hub, a sleeve rotatably mounted on the hub and collar provided with inwardly extending bolts carrying rollers, said rollers being positioned between the cam surfaces to operate on the same, means for rotating said sleeve, and means for normally holding the brake inactive.

3. A brake, comprising a wheel member, a female cone member carried by said wheel member, an axle, a rigid tubing encircling the axle and abutting against said wheel member, a male cone member slidably mounted on the tubing for engagement with the female cone member, a hub on the male cone member provided at one end with cam surfaces, a collar rigidly secured to the tubing adjacent the hub, said collar being provided with cam surfaces adjacent those of the hub and an angular extension integral with the opposite end thereof, a sleeve rotatably mounted on the hub and collar provided with inwardly extending roller journals, rollers, said rollers being positioned between the cam surfaces to operate on the same, spring means connected to the angular extensions and the male cone member to normally hold the member disengaged, an arm extending at an angle from the sleeve for operating the same, and resilient means connecting said arm and extension for normally holding the sleeve inoperative.

In testimony whereof I affix my signature in presence of two witnesses.

GLENN E. DALE.

Witnesses:
   CHAS. O. EDWARDS,
   J. A. ROSE.